US010593011B2

(12) United States Patent
Shen et al.

(10) Patent No.: US 10,593,011 B2
(45) Date of Patent: Mar. 17, 2020

(54) METHODS AND APPARATUS TO SUPPORT DYNAMIC ADJUSTMENT OF GRAPHICS PROCESSING UNIT FREQUENCY

(71) Applicant: Intel Corporation, Santa Clara, CA (US)

(72) Inventors: Lei Shen, Shanghai (CN); Guei-Yuan Lueh, San Jose, CA (US); Yong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/122,108

(22) PCT Filed: Mar. 27, 2014

(86) PCT No.: PCT/CN2014/074166
§ 371 (c)(1),
(2) Date: Aug. 26, 2016

(87) PCT Pub. No.: WO2015/143657
PCT Pub. Date: Oct. 1, 2015

(65) Prior Publication Data
US 2017/0076422 A1    Mar. 16, 2017

(51) Int. Cl.
*G06F 1/324* (2019.01)
*G06T 1/60* (2006.01)
(Continued)

(52) U.S. Cl.
CPC .............. *G06T 1/60* (2013.01); *G06F 1/324* (2013.01); *G06F 1/3243* (2013.01);
(Continued)

(58) Field of Classification Search
CPC ... G06T 1/20; G06T 1/60; G06F 1/324; G06F 1/3243; G06F 1/3296; G06F 8/451;
(Continued)

(56) References Cited

U.S. PATENT DOCUMENTS

2008/0034236 A1    2/2008  Takayama
2013/0024707 A1    1/2013  Miwa
(Continued)

FOREIGN PATENT DOCUMENTS

CN        102866765        1/2013
CN        103246340        8/2013
(Continued)

OTHER PUBLICATIONS

Wu, Qiang, et al. "A dynamic compilation framework for controlling microprocessor energy and performance." Proceedings of the 38th annual IEEE/ACM International Symposium on Microarchitecture. IEEE Computer Society, 2005. (Year: 2005).*
(Continued)

*Primary Examiner* — Diane M Wills
(74) *Attorney, Agent, or Firm* — Barnes & Thornburg LLP (57) ABSTRACT

Disclosed methods support dynamic adjustment of graphics processing unit (GPU) frequency. According to one embodiment, a program comprises workload to execute, at least in part, on a GPU of a data processing system. A predetermined memory/compute ratio for the program is automatically retrieved, in response to the program being called for execution. The memory/compute ratio represents a ratio of memory accesses within the program, relative to compute operations within the program. In addition, a frequency of the GPU is automatically adjusted, based on the predetermined memory/compute ratio for the program. For instance, the GPU may be set to a relatively low frequency if the predetermined memory/compute ratio is relatively high, or to a relatively high frequency if the predetermined ratio is relatively low. After the frequency of the GPU is automatically adjusted, the program may execute, at least in part, on the GPU. Other embodiments are described and claimed.

20 Claims, 4 Drawing Sheets

(51) Int. Cl.
*G06F 8/41* (2018.01)
*G06F 1/3234* (2019.01)
*G06F 1/3296* (2019.01)
*G06F 9/50* (2006.01)
*G06T 1/20* (2006.01)

(52) U.S. Cl.
CPC ............ *G06F 1/3296* (2013.01); *G06F 8/451* (2013.01); *G06F 9/505* (2013.01); *G06T 1/20* (2013.01); *Y02D 10/126* (2018.01); *Y02D 10/152* (2018.01)

(58) Field of Classification Search
CPC ....... G06F 9/505; G06F 9/50; Y02B 60/1217; Y02B 60/1239
See application file for complete search history.

(56) References Cited

U.S. PATENT DOCUMENTS

2013/0205149 A1    8/2013   Chen
2013/0321437 A1   12/2013   Hsieh et al.

FOREIGN PATENT DOCUMENTS

| | | |
|---|---|---|
| EP | 1116089 | 7/2001 |
| JP | 2005196430 | 7/2005 |
| WO | 2011/073109 | 6/2011 |
| WO | 2015/143657 A1 | 10/2015 |

OTHER PUBLICATIONS

International Search Report with Written Opinion received for PCT Application No. PCT/CN2014/074166, dated Jan. 9, 2015, 11 Pages.
Kwon, Cathi, "Open Source Media Framework", retrieved from <https://osmf.org/> on Feb. 20, 2014, 2 Pages.
Intel Developer Zone, "About "C for Media" Runtime . . . ", retrieved from <http://softwareintel.com/en-us/forums/topic/278468> on Dec. 11, 2013, 1 Page.
Lueh, Guei-Yuan, "C-for-Media: High-Level Programming Environment for Efficient Utilization of Intel Processor-GPU", Institute of Information Science Academia Sinica, retrieved from <http://www.iis.sinica.edu.tw/HTML/seminar/DJ110079_en.html> on Dec. 12, 2013, 2 Page.
Wikipedia, "Open Source Media Framework", retrieved from <https://en.wikipedia.org/wiki/Open_Source_Media_Framework> on Feb. 20, 2014, 2 Pages.
Second Office action in Chinese patent application No. 201480076435.2, dated Apr. 26, 2019, including English translation (15 pages).
Extended European search report in European patent application No. 14886851.6, dated Sep. 25, 2017 (17 pages).
Office Action in European patent application No. 14886851.6, dated Oct. 7, 2018 (8 pages).
First Office action in Chinese patent application No. 201480076435.2, dated Aug. 1, 2018, including English translation (20 pages).
Office action in Korean patent application No. 20-2016-7023134, dated Sep. 30, 2017, including machine translation (17 pages).

* cited by examiner

METHODS AND APPARATUS TO SUPPORT DYNAMIC ADJUSTMENT OF GRAPHICS PROCESSING UNIT FREQUENCY

CROSS-REFERENCE TO RELATED APPLICATIONS

This application is a national stage patent application under 35 U.S.C. § 371, based on international patent application number PCT/CN2014/074166, filed on Mar. 27, 2014, titled "Methods And Apparatus To Support Dynamic Adjustment Of Graphics Processing Unit Frequency."

TECHNICAL FIELD

Embodiments described herein relate generally to data processing and in particular to methods and apparatus to support dynamic adjustment of graphics processing unit frequency.

BACKGROUND

A conventional data processing system may include at least one central processing unit (CPU) and at least one graphics processing unit (GPU). The CPU and the GPU may reside on the same chip, or they may reside on separate chips that are connected by one or more buses. A single chip that contains at least one CPU and at least one GPU may be referred to as an accelerated processing unit, an advanced processing unit, or an APU. The GPU in a data processing system may operate at a different frequency than the CPU.

As indicated at the Wikipedia entry for "dynamic frequency scaling," the voltage required for stable operation of a circuit is determined by the frequency at which the circuit is clocked, and it may be possible to reduce the required voltage if the frequency is also reduced.

The present disclosure describes methods and apparatus for dynamically adjusting GPU frequency and voltage. Data processing systems may use the disclosed technology to achieve more energy efficient operation than conventional data processing systems.

DESCRIPTION OF EMBODIMENTS

A program that executes in a data processing system may be considered a kernel or a workload. A workload on a GPU may be compute bound or memory bound. A compute-bound workload may focus mainly on performing mathematical algorithms, and its performance may rely on GPU performance. Consequently, for a compute-bound workload, increasing GPU frequency may result in significantly increased performance (e.g., significantly faster execution). A memory-bound workload may focus mainly on memory accessing, and its performance may be highly limited by memory access bandwidth. Consequently, for a memory-bound workload, once memory access bandwidth has been met, increasing the GPU frequency would result in little, if any, performance improvement. Accordingly, for a memory-bound workload, increasing the GPU frequency may yield diminishing returns. Thus, for a memory-bound workload, increasing the GPU frequency may cause a significant increase in energy consumption without yielding any significant performance improvement.

For example, for a GPU with frequency adjustable from 400 megahertz (MHz) to 1150 MHz, a compute-bound workload may obtain a substantially linear increase in performance as frequency of the GPU is increased from the minimum frequency to the maximum frequency. By contrast, a memory-bound workload may obtain increases in performance as frequency is adjust from 400 MHz to 700 MHz, but little or no further increase in performance as frequency is adjusted above 700 MHz. Consequently, to maximize efficiency, it would be desirable to set the GPU frequency at or below 700 MHz for the memory-bound workload.

The present disclosure describes methods and apparatus for dynamically adjusting GPU frequency. In one embodiment, a data processing system dynamically adjusts GPU frequency and voltage based on a predetermined memory/compute ratio.

For purposes of this disclosure, a memory/compute ratio is a value that identifies the number, prevalence, or significance of memory access operations in a program, relative to the compute operations in the program. Thus, if a first program spends more time performing memory access operations than a second program, the first program will have a higher memory/compute ratio. Similarly, if two programs have the same number of compute operations, but one of those programs has more memory access operations than the other program, the program with more memory access operations would typically have a higher memory/compute ratio.

In one embodiment, a runtime manager retrieves a predetermined memory/compute ratio for a program that is to execute at least partially on a GPU. The runtime manager then dynamically adjusts the frequency of the GPU, based on the predetermined memory/compute ratio. In particular, if a program has a relatively high memory/compute ratio, the runtime manager may set the GPU to a relatively low frequency; and if a program has a relatively low memory/compute ratio, the runtime manager may set the GPU to a relatively high frequency. The runtime manager then launches the program to execute at least in part in the GPU.

Consequently, for a program that will be spending significant amounts of time waiting for memory access, the runtime manager may set the GPU to a relatively low frequency and a relatively low voltage, thereby reducing power consumption without significantly reducing performance. And for a program that will be spending little to no time waiting for memory access, the runtime manager may set the GPU to a relatively high frequency and a relatively high voltage, thereby increasing power consumption when that increase will result in significantly better performance.

Alternative embodiments may use an inverse approach, with the factor for memory access operations appearing in the denominator, rather than the numerator (e.g., a compute/memory ratio, instead of a memory/compute ratio). For purposes of this disclosure, unless the context clearly requires otherwise, the term "memory/compute ratio" should be understood as covering any value that identifies the proportion of memory access operations in a program, relative to the compute operations in the program. Similarly, when this disclosure refers to a "high" memory/compute ratio, the disclosure is referring to a value or measurement which indicates that the program has a high proportion of memory access operations, relative to compute operations, even though the "memory/compute ratio" measurement may have a relatively small numerical value (e.g., when the factor for memory access operations appears in the denominator).

For purposes of this disclosure, a "relatively low" GPU frequency is a frequency that is lower than the maximum frequency of the GPU and that consumes significantly less energy than the maximum frequency, while a "relatively high" GPU frequency is a frequency that is higher than the minimum frequency of the GPU and that consumes significantly more energy than the minimum frequency.

Similarly, a "relatively high" memory/compute ratio means that the program spends more time performing memory access operations than compute operations, while a "relatively low" memory/compute ratio means that the program spends less time performing memory access operations than compute operations As described in greater detail below, according to one embodiment, a compiler automatically determines the memory/compute ratio for a target program when the compiler compiles the source code for the target program into object code. According to another embodiment, the memory/compute ratio is determined based on information collected by a software profiler during a test execution of the target program. According to another embodiment, the memory/compute ratio is determined based on information collected by hardware performance counters during a test execution of the target program.

Figure 1:
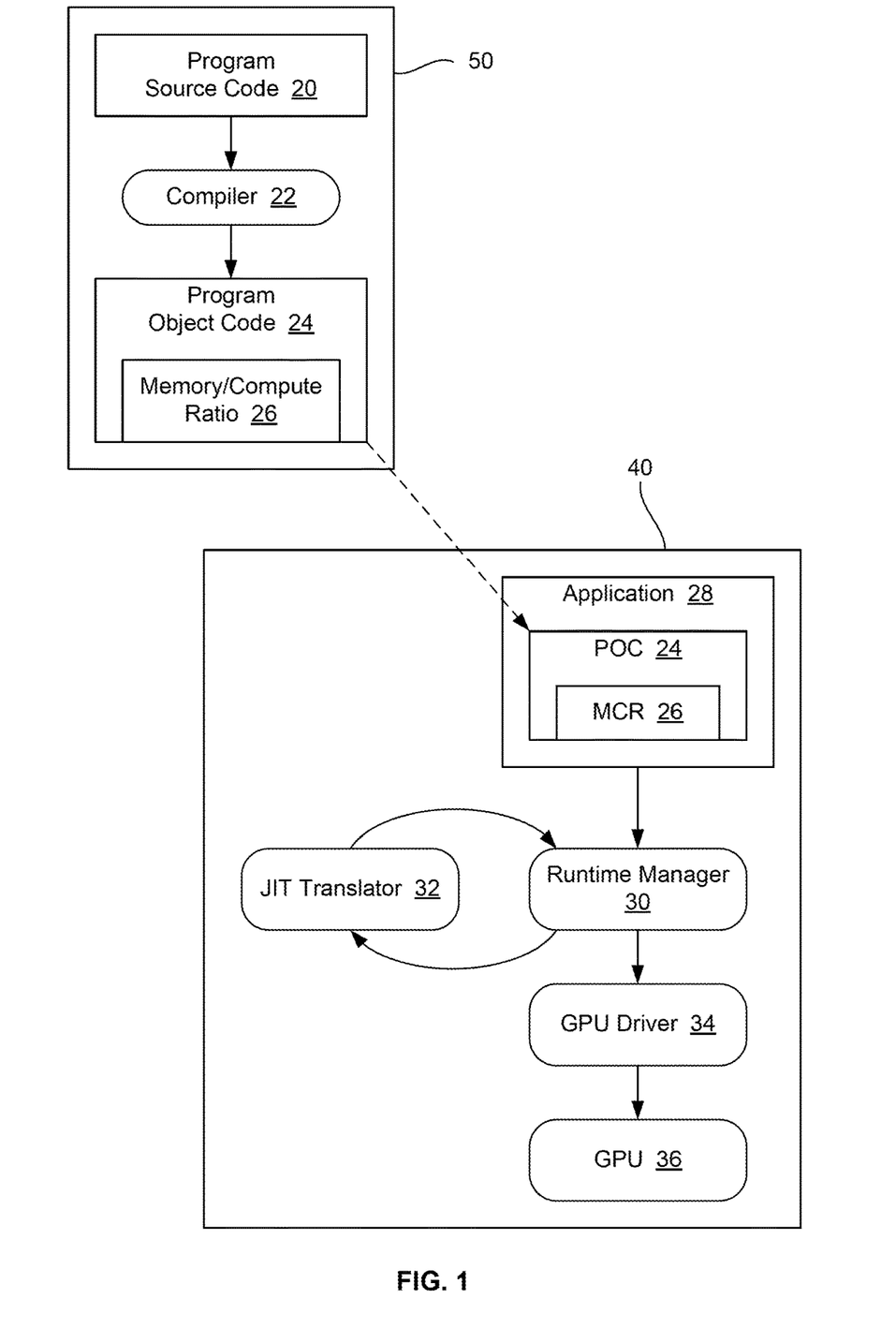
FIG. 1 is a block diagram that depicts an example process for compiling and executing a program.

FIG. 1 is a block diagram of an example process for compiling a program and executing that program at least partially on a GPU. For purposes of this disclosure, the program that is compiled and executed is referred to as the target program. The target program may exist in a variety of different versions. For example, it may start as source code, and it may then be compiled into object code. The object code may then be converted into executable code. Accordingly, one version of the target program may be referred to as program source code 20, another version may be referred to as program object code 24, and another version may be referred to as program executable code. Program object code 24 may also be referred to as a virtual binary program.

In the embodiment of FIG. 1, a processing device 50 uses a compiler 20 to convert the program source code 20 for the target program into program object code 24. In addition, as described in greater detail below with regard to FIG. 3, when compiler 22 processes program source code 20, compiler 22 computes or determines a memory/compute ratio 26 for the target program. Compiler 22 records that memory/compute ratio 26 within program object code 24.

In the embodiment of FIG. 1, one processing device 50 compiles program source code 20 into program object code 24, and then another processing device 40 obtains and executes program object code 24. In other embodiments, however, the same processing device may be used for compiling the target program and for executing the target program.

In the embodiment of FIG. 1, compiler 22 may be part of a GPU programming framework or a media development framework (MDF) that runs on processing device 50. A software developer may use the MDF to create an application 28 that includes the target program. For instance, application 28 may be a media player application, and the target program may be a video subroutine for application 28. The program object code for the application (including program object code 24 for the target program) may then be delivered to processing device 40, and an end user at processing device 40 may then use the target program for its intended purpose.

Figure 2:
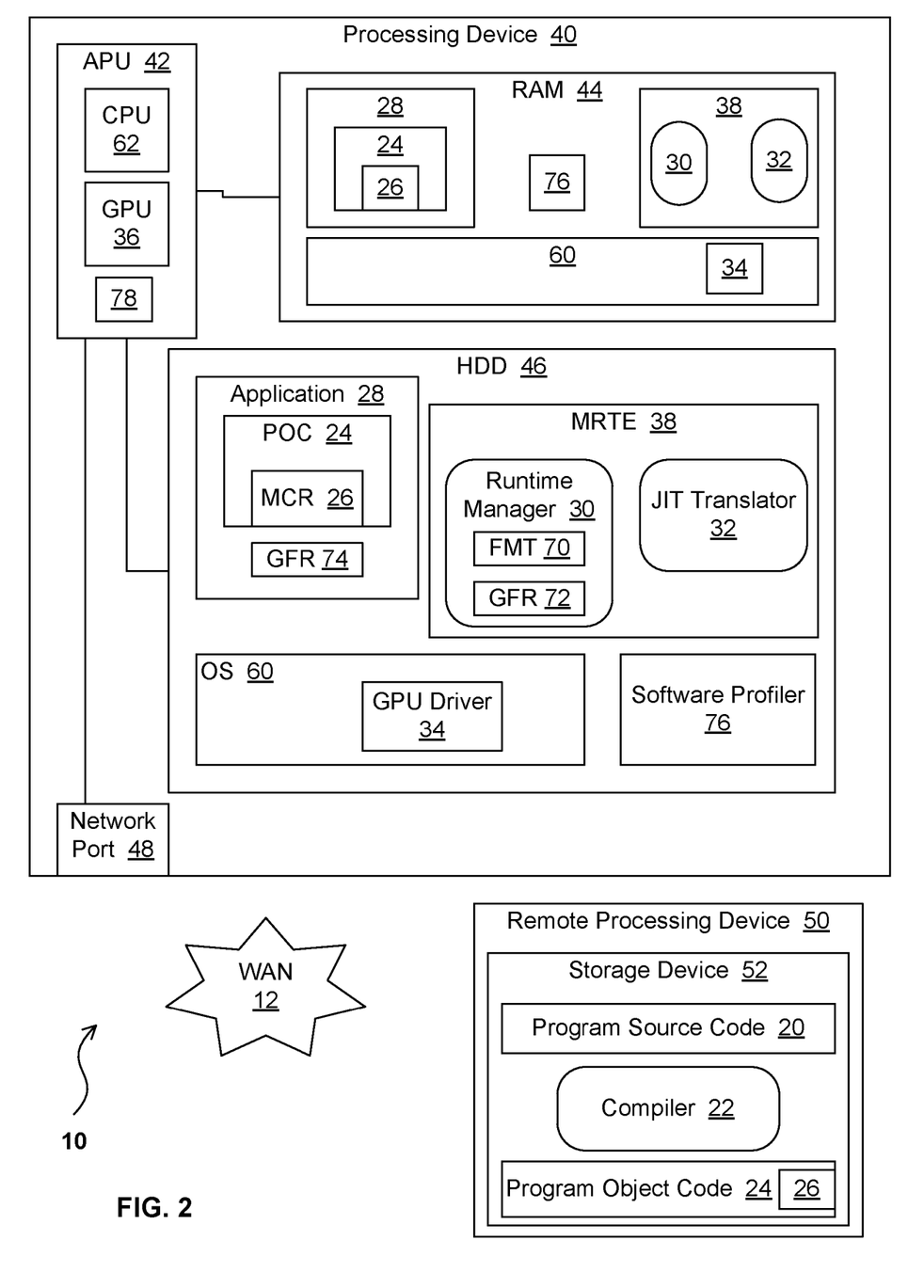
FIG. 2 is a block diagram of an example data processing system with features for dynamically adjusting GPU frequency.

FIG. 2 is a block diagram of an example data processing system with features for dynamically adjusting GPU frequency. In FIG. 2, the processing device that compiles program source code 20 is referred to as remote processing device 50, while the processing device that executes program object code 24 is referred to as local processing device 40—or simply as processing device 40. Processing device 40 may obtain program object code 24 via any suitable storage medium or media, via any suitable communications medium or media, or any suitable combinations of storage and communications media. For instance, processing device 40 may obtain program object code 24 via an optical disc, a flash drive, etc. Alternatively, processing device 40 may retrieve program object code 24 from remote processing device 50 via a wide area network (WAN) 12, such as the Internet, or via a local area network (LAN). Local processing device 40 and remote processing device 50 may be referred to collectively as a distributed data processing system 10.

In one embodiment, processing device 40 uses program object code 24 as part of an application 28. For instance, as indicated above, application 28 may be a media player application, and program object code 24 may implement a video subroutine for application 28. For example, program object code 24 may implement a Motion Pictures Encoding Group (MPEG) video decoder. Alternatively, application 28 may be a computer-aided design (CAD) application, and program object code 24 may implement a library of mathematical functions for the CAD application, possibly including functions for processing vectors, matrices, etc. Other types of applications, subroutines, and such may be used in other embodiments.

Referring again to FIG. 1, application 28 and program object code 24 may be implemented in an intermediate representation or version (e.g., as bytecode), and local processing device 40 may use a runtime manager 30 to execute application 28 (including program object code 24). Components such as application 28 may also be referred to as host code.

When executing host code such as application 28, runtime manager 30 may use a just-in-time (JIT) translator 32 to convert the bytecode into executable code. The executable code may also be referred to as assembly code or binary code. JIT translator 32 may include a JIT compiler, an interpreter, and/or any other suitable logic for executing application 28. Runtime manager 30 may be implemented as a dynamic link library, as a shared library, or as any other suitable construct. In addition, runtime manager 30 may expose one or more application programming interfaces (APIs) for applications to call. Runtime manager 30, JIT translator 32, and related components may be referred to collectively as a managed runtime environment (MRTE) 38.

In one embodiment, when an end user at processing device 40 launches application 28, runtime manager 30 uses JIT translator 32 to generate executable code for application 28, and runtime manager 30 may dispatch that executable code for execution on CPU 62. Likewise, when application 28 calls or loads the target program, runtime manager 30 may use JIT translator 32 to generate executable code for the target program. However, runtime manager 30 may dispatch the executable code for the target program for execution on GPU 36, rather than CPU 62. In other words, some or all of the executable code produced by runtime manager 30 for the target program may include operations to be performed on one or more GPUs 36 within processing device 40. In one embodiment, runtime manager 30 calls a GPU driver 34 of an operating system 60 to cause such operations to be processed by GPU 36.

However, as described in greater detail below with regard to FIG. 4, before executing the target program on GPU 36, runtime manager 30 may dynamically adjust the frequency and voltage of GPU 36. For example, when application 28 calls or invokes program object code 24, runtime manager 30 may automatically consider the memory/compute ratio 26 associated with program object code 24, and runtime manager 30 may then dynamically adjust the frequency and voltage of GPU 36, based on memory/compute ratio 26.

In one embodiment, runtime manager 30 is equipped with a frequency mapping table (FMT) 70 which links different memory/compute ratios with corresponding GPU frequencies. For instance, FMT 70 may link memory/compute ratios with respective GPU frequencies according to an inverse relationship, in that progressively higher memory/compute ratios are linked to progressively lower GPU frequencies, while lower memory/compute ratios are linked to higher GPU frequencies. For instance, in one embodiment, FMT 70 may contain data such as that illustrated in the following Table T1:

| Memory/Compute Ratio | GPU Freq. (MHz) |
|---|---|
| <=R1 | 1150 |
| >R1 and <=R2 | 1000 |
| >R2 and <=R3 | 900 |
| >R3 and <=R4 | 800 |
| >R4 | 700 |

In Table T1, the entries in the column for "Memory/Compute Ratio" represent progressively higher ranges of memory/compute ratios.

FMT 70 may be based on experiments that have been run with actual and/or contrived workloads at a variety of different GPU frequencies on a variety of different hardware platforms. The data from those experiments may be used to plot the relationship between the memory/compute ratio, the frequency, and the performance efficiency. The results of such analyses may be used to build tables to specify optimally efficient GPU frequencies for numerous different memory/compute ratios for many different platforms. The entries for an FMT may also be based on memory frequency, memory bandwidth, and other factors.

In an alternative embodiment, instead of using an FMT, a runtime manager may use a different technique to determine a suitable GPU frequency for a particular program. For example, a runtime manager may be programmed to recognize one or more different predetermined types of workloads. The runtime manager may also be programmed to use a particular frequency for each different type of workload. When a target program is called, the runtime manager may determine the type of workload to be performed by the target program, and the runtime manager may set the GPU frequency accordingly.

Processing device 40 may include a variety of hardware and software resources. For instance, in the embodiment of FIG. 2, processing device 40 includes at least one APU 42, and APU 42 includes at least one CPU 62 and at least one GPU 36. APU 42 may also include various hardware performance counters 78. Processing device 40 also includes random access memory (RAM) 44, a hard disk drive (HDD) 46, and a network port 48 in communication with CPU 62 and/or GPU 36. In addition or alternatively, processing device 40 may include other types of storage devices (e.g., flash memory), other input/output (I/O) ports, multiple processors, and/or other components. The composition of remote processing device 50 may be the same as or similar to that of processing device 40.

As indicated above, GPU driver 34 may be part of operating system 60. Operating system 60, application 28, MRTE 38, and a software profiler 76 may be stored in HDD 46 and copied to RAM 44 for execution.

Figure 3:
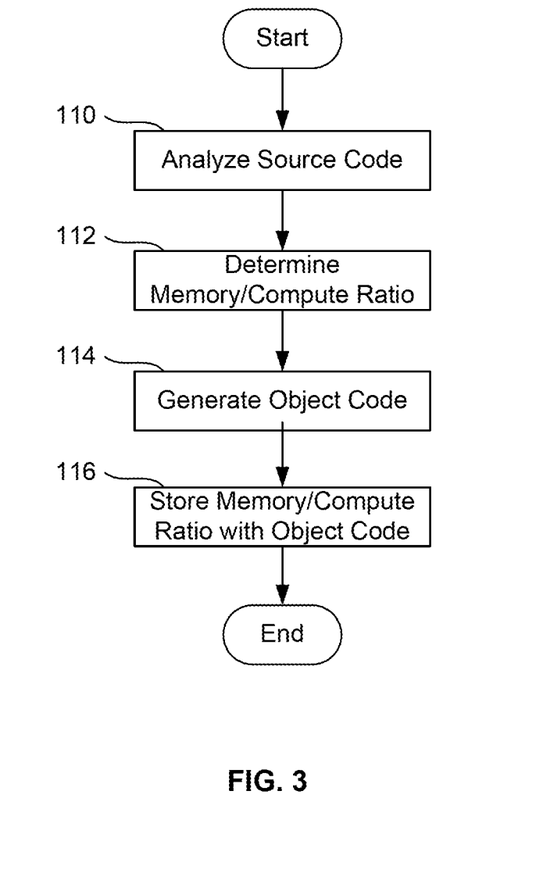
FIG. 3 is a flowchart of an example process for generating a memory/compute ratio for a program in connection with compiling the program.

FIG. 3 is a flowchart of an example process for generating a memory/compute ratio for a program in connection with compiling the program. As shown at block 110, the process starts with compiler 22 statically analyzing program source code 20 to determine how many compute operations and how many memory operations are used by the target program. For instance, compiler 22 may use a control flow analysis to estimate the number of compute operations and the number of memory operations. For example, in the control flow analysis, more weights or counts may be assigned for operations inside nested loops.

As shown at block 112, compiler 22 then determines the memory/compute ratio 26 for the target program, based on the results of the analysis of program source code 20. For instance, compiler 22 may generate a memory/compute ratio of 10:1 for a program that is very memory bound, 2:1 for a program that is slightly memory bound, 1:2 for a program that is slightly compute bound, and 1:10 for a program that is very compute bound. Referring again to Table T1, in one embodiment, R1=1:10, R2=1:2, R3=2:1, and R4=10:1.

As shown at block 114, compiler 22 also generates program object code 24 for the target program, based on program source code 20. As indicated above, in one embodiment, program object code 24 uses a bytecode representation of the target program. As shown at block 116, compiler 22 stores the generated memory/compute ratio 26 with program object code 24. For instance, the file format specification for program object code 24 may provide for fields to save the workload information, like name, size, memory/compute ratio, and other necessary information; and compiler 22 may load memory/compute ratio 26 into the memory/compute ratio field.

The process of FIG. 3 may then end.

In other embodiments, a device like processing device 50 or processing device 40 may use feedback from software profiler 76 and/or from hardware performance counters 78 to count or track memory and compute operations, and to generate corresponding memory/compute ratios. For instance, the developer of the target program may execute program source code 20 one or more times within an MRTE in processing device 50, with a software execution profiler monitoring execution and counting memory operations and total operations. Alternatively, the developer may use hardware performance counters to monitor execution and count or track memory operations and total operations during a test execution of program source code 20. The developer may then compute the memory/compute ratio 26, based on the data from the test execution or executions of the target program. When memory and compute operations are being tracked, the tracker may consider the number of compute operations and the number of memory operations. In addition or alternatively, the tracker may consider the amount of time spent executing compute operations and the amount of time spent executing memory operations. The generated memory/compute ratio may then be passed to the runtime manager.

Figure 4:
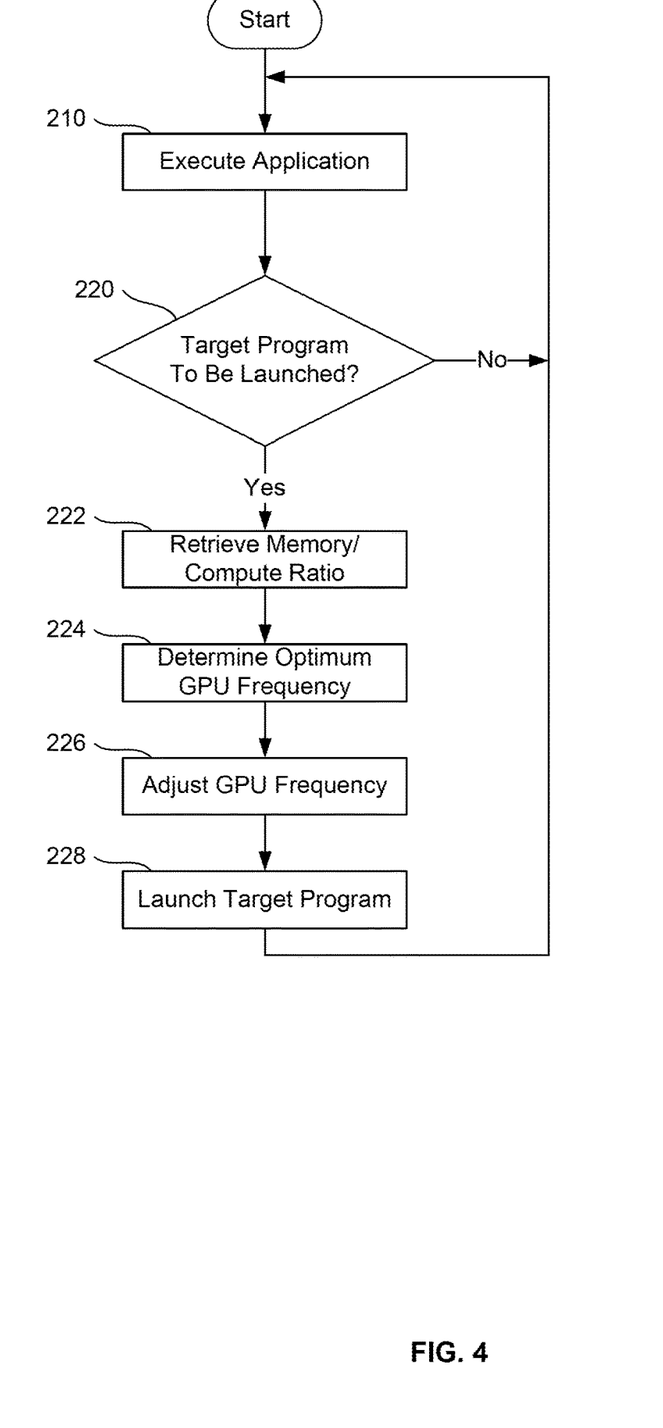
FIG. 4 is a flowchart of an example process for dynamically adjusting GPU frequency.

FIG. 4 is a flowchart of an example process for dynamically adjusting GPU frequency. In one embodiment, processing device 40 uses the illustrated process to optimize execution efficiency for the target program. The process may begin with runtime manager 30 executing application 28, as shown at block 210. As shown at block 220, runtime manager 30 may then determine whether application 28 is calling the target program (or any other program with a predetermined memory/compute ratio for guiding dynamic adjustment of GPU frequency). If application 28 is calling program object code 24 for the target program, runtime manager 30 retrieves memory/compute ratio 26 from program object code 24, as shown at block 222. As shown at block 224, runtime manager 30 then uses FMT 70 to automatically determine an optimum GPU frequency for the target program, based on memory/compute ratio 26.

As shown at block 226, runtime manager 30 then dynamically and automatically adjusts the frequency of GPU 36 according to the optimum frequency identified by FMT 70. In one embodiment, runtime manager 30 adjusts the frequency of GPU 36 by issuing one or more GPU commands to GPU 36, possibly via GPU driver 34. In addition or alternatively, runtime manager 30 may write directly to a frequency control register of GPU 36. In either case, GPU 36 may then respond by immediately adjusting its frequency and voltage.

The logic within runtime manager for adjusting the frequency of GPU 36, based on memory/compute ratio 26 and FMT 70 may be referred to as a GPU frequency regulator (GFR) 72. Runtime manager 30 may use GFR 72 to manage or control the frequency of GPU 36, based on the predetermined memory/compute ratio 26 in program object code 24 and the predetermined frequency mapping table 70.

As shown at block 228, after runtime manager 30 has adjusted the frequency of GPU 36, runtime manager 30 launches program object code 24 for the target program. The target program may then run at least partially on GPU 36.

However, referring again to block 220, if application 28 is not calling a program with a predetermined memory/compute ratio, runtime manager 30 may continue executing application 28 without adjusting the frequency of GPU 36, as indicated by the arrow returning to block 210.

In addition or alternatively, application 28 may include its own GFR 74, and instead of using GFR 72 in runtime manager 30, application 28 may use GFR 74 to automatically adjust GPU frequency for the target program, based on the memory/compute ratio for that program. For instance, application 28 may automatically retrieve the memory/compute ratio for the target program in response to a call to the target program, and application 28 may then use GFR 74 to automatically adjust the frequency of the GPU, based on that memory/compute ratio. In one embodiment, runtime manager 30 provides an API for adjusting the frequency of GPU 36, and GFR 74 uses that API to adjust the GPU frequency.

In addition or alternatively, runtime manager 30 may use (a) a software-based program execution profiler such as software profiler 76 and/or (b) hardware-based performance counters 78 to dynamically determine the memory/compute ratio for the target program, and runtime manager 30 may automatically adjust GPU frequency for the target program, based on the dynamically determined memory/compute ratio. For example, after the target program has been executing, the runtime manager may query software profiler 76 and/or hardware performance counters 78 during runtime. In response, software profiler 76 and/or hardware performance counters 78 may return feedback indicative of the actual memory/compute ratio for the target program. Based on that feedback, and based on an FMT or other suitable mapping data, runtime manager 30 may automatically adjust the frequency of the GPU upon which the target program is executing. Such dynamic determinations and adjustments may be more accurate than predetermined (or estimated) memory/compute ratios. Accordingly, even though the target program may have a predetermined memory/compute ratio, the runtime manager may give precedence to a dynamically determined memory/compute ratio for the target program.

As has been described, a runtime manager in a processing device may automatically use a predetermine memory/compute ratio for a target program to determine an efficient or optimum GPU frequency for executing the target program. The runtime manager may then automatically adjust the frequency and voltage of the GPU accordingly, before executing the target program on the GPU. The processing device may therefore operate more efficiently than conventional processing device.

In addition or alternatively, a runtime manager may dynamically determine a memory/compute ratio for a target program, and the time manager may use that memory/compute ratio to determine an efficient or optimum GPU frequency for executing the target program.

Other embodiments have also been described.

By dynamically adjusting GPU frequency and voltage according to the present teachings, a data processing system may achieve more energy efficient operation than a conventional data processing system.

In light of the principles and example embodiments described and illustrated herein, it will be recognized that the illustrated embodiments can be modified in arrangement and detail without departing from those principles. Also, the foregoing discussion has focused on particular embodiments, but other configurations are contemplated. For example, aspects the disclosed embodiments are generally combinable to form additional embodiments. Accordingly, expressions such as "an embodiment," "the embodiment of Figure X," "one embodiment," "another embodiment," and the like should generally be understood as describing embodiment possibilities, rather than limiting the invention to a particular embodiment configuration. Accordingly, different instances of phrases which refer, for example, to one embodiment should generally be understood as referring to the same embodiment and to different embodiments, and the phrase "in one embodiment" should generally be understood as meaning "in at least one embodiment."

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In one embodiment, the instructions for all components may be stored in one non-transitory machine accessible medium. In another embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with support for dynamic adjustment of GPU frequency. The data processing system comprises a CPU, a GPU responsive to the CPU, a machine accessible medium responsive to the CPU, and data in the machine accessible medium which, when accessed by the CPU, enables the data processing system to perform certain operations. Those operations comprise: (a) in response to a program being called for execution, automatically retrieving a predetermined memory/compute ratio for the program, wherein the program comprises workload to execute at least in part on the GPU, and wherein the predetermined memory/compute ratio represents a ratio of memory accesses within the program, relative to compute operations within the program; and (b) automatically adjusting a frequency of the GPU, based on the predetermined memory/compute ratio for the program.

Example A2 includes the features of Example A1, and the operations further comprise, after automatically adjusting the frequency of the GPU, launching the program to execute at least partially on the GPU.

Example A3 includes the features of Example A1, and the operation of automatically adjusting the frequency of the GPU, based on the predetermined memory/compute ratio for the program, comprises: (a) setting the GPU to a relatively low frequency if the predetermined memory/compute ratio for the program is relatively high; and (b) setting the GPU to a relatively high frequency if the predetermined memory/compute ratio for the program is relatively low. Example A3 may also include the features of Example A2.

Example B1 is a method for dynamically adjusting the frequency of a GPU. The method comprises: (a) in response to a program being called for execution in a data processing system with a GPU, automatically retrieving a predetermined memory/compute ratio for the program, wherein the program comprises workload to execute at least in part on the GPU, and wherein the predetermined memory/compute ratio represents a ratio of memory accesses within the program, relative to compute operations within the program;

and (b) automatically adjusting a frequency of the GPU, based on the predetermined memory/compute ratio for the program.

Example B2 includes the features of Example B1. In addition, the method comprises, after automatically adjusting the frequency of the GPU, launching the program to execute at least partially on the GPU.

Example B3 includes the features of Example B1. In addition, the operation of automatically adjusting the frequency of the GPU, based on the predetermined memory/compute ratio for the program, comprises: (a) setting the GPU to a relatively low frequency if the predetermined memory/compute ratio for the program is relatively high; and (b) setting the GPU to a relatively high frequency if the predetermined memory/compute ratio for the program is relatively low. Example B3 may also include the features of Example B2.

Example B4 includes the features of Example B3. In addition, the operation of setting the GPU to a relatively low frequency if the predetermined memory/compute ratio for the program is relatively high comprises automatically reducing a voltage level of the GPU if the predetermined memory/compute ratio for the program is relatively high. Example B4 may also include the features of Example B2.

Example B5 includes the features of Example B1. In addition, the method comprises using a predetermined mapping that maps different memory/compute ratios to respective GPU frequencies to identify a GPU frequency that corresponds with the memory/compute ratio of the program. Also, the operation of automatically adjusting the frequency of the GPU, based on the predetermined memory/compute ratio for the program comprises adjusting the frequency of the GPU, based on the identified GPU frequency. Example B5 may also include the features of any one or more of Example B2 through B4.

Example B6 includes the features of Example B1. In addition, execution of the program is managed by a runtime manager, and the operation of automatically retrieving the memory/compute ratio for the program is performed by the runtime manager. Example B5 may also include the features of any one or more of Example B2 through B5.

Example B7 includes the features of Example B1. In addition, execution of the program is managed by a runtime manager, and the operation of automatically adjusting the frequency of the GPU is performed by the runtime manager. Example B6 may also include the features of any one or more of Example B2 through B6.

Example B8 includes the features of Example B1. In addition, the method comprises: (a) determining the memory/compute ratio for the program; and (b) after determining the memory/compute ratio for the program, recording the memory/compute ratio for the program with object code for the program. Example B7 may also include the features of any one or more of Example B2 through B7.

Example C1 is a method to support dynamic adjustment of GPU frequency. The method comprises (a) determining a memory/compute ratio for a program with workload suitable for execution on a GPU; and (b) after determining the memory/compute ratio for the program, recording the memory/compute ratio for the program with object code for the program.

Example C2 includes the features of Example C1. In addition, the method comprises compiling source code for the program into object code. Also, the operation of determining the memory/compute ratio for the program is performed automatically while compiling the program.

Example D1 is a method for dynamically adjusting the frequency of a GPU. The method comprises: (a) executing a program on a GPU of a data processing system; (b) obtaining performance data for the program while the program is executing; (c) while the program is executing, determining a memory/compute ratio for the program, based on the performance data, wherein the memory/compute ratio represents a ratio of memory accesses within the program, relative to compute operations within the program; and (d) dynamically adjusting a frequency of the GPU, while the program is executing, based on the memory/compute ratio.

Example D2 includes the features of Example D1. In addition, the operation of obtaining performance data for the program while the program is executing comprises at least one operation from the group consisting of: (a) obtaining the performance data from a software-based profiler; and (b) obtaining the performance data from at least one hardware performance counter.

Example E is at least one machine accessible medium comprising computer instructions to support dynamic adjustment of GPU frequency. The computer instructions, in response to being executed on a data processing system, enable the data processing system to perform a method according to any one or more of Examples B1 through B7, C1 through C2, and D1 through D2.

Example F is a data processing system with features to support dynamic adjustment of GPU frequency. The data processing system comprises a central processing unit (CPU), a GPU responsive to the CPU, at least one machine accessible medium responsive to the CPU, and computer instructions stored at least partially in the at least one machine accessible medium. Also, in response to being executed, the computer instructions enable the data processing system to perform a method according to any one or more of Examples B1 through B7, C1 through C2, and D1 through D2.

Example G is a data processing system with features to support dynamic adjustment of GPU frequency. The data processing system comprises means for performing the method of any one or more of Examples B1 through B7, C1 through C2, and D1 through D2.

Example H1 is an apparatus to support dynamic adjustment of GPU frequency. The apparatus comprises (a) a non-transitory machine accessible medium; and (b) data in the machine accessible medium which, when accessed by a data processing system with a GPU, enables the data processing system to perform various operations. Those operations comprise: (a) in response to a program being called for execution in the data processing system, automatically retrieving a predetermined memory/compute ratio for the program, wherein the program comprises workload to execute at least in part on the GPU, and wherein the predetermined memory/compute ratio represents a ratio of memory accesses within the program, relative to compute operations within the program; and (b) automatically adjusting a frequency of the GPU, based on the predetermined memory/compute ratio for the program.

Example H2 includes the features of Example H1. Also, the operations further comprise, after automatically adjusting the frequency of the GPU, launching the program to execute at least partially on the GPU.

Example H3 includes the features of Example H1. Also, the operation of automatically adjusting the frequency of the GPU, based on the predetermined memory/compute ratio for the program, comprises (a) setting the GPU to a relatively low frequency if the predetermined memory/compute ratio for the program is relatively high; and (b) setting the GPU to a relatively high frequency if the predetermined memory/compute ratio for the program is relatively low. Example H3 may also include the features of Example H2.

Example H4 includes the features of Example H1. Also, the operations further comprise using a predetermined mapping that maps different memory/compute ratios to respective GPU frequencies to identify a GPU frequency that corresponds with the memory/compute ratio of the program. Also, the operation of automatically adjusting the frequency of the GPU, based on the predetermined memory/compute ratio for the program comprises adjusting the frequency of the GPU, based on the identified GPU frequency. Example H4 may also include the features of any one or more of Example H2 through H3.

Example H5 includes the features of Example H1, Also, the data in the machine accessible medium comprises a runtime manager to manage execution of the program. Also, the operation of automatically retrieving the memory/compute ratio for the program is performed by the runtime manager. Example H5 may also include the features of any one or more of Example H2 through H4.

Example H6 includes the features of Example H1. Also, the data in the machine accessible medium comprises a runtime manager to manage execution of the program. Also, the operation of automatically adjusting the frequency of the GPU is performed by the runtime manager. Example H6 may also include the features of any one or more of Example H2 through H5.

Example I1 is an apparatus to support dynamic adjustment of GPU frequency. The apparatus comprising (a) a non-transitory machine accessible medium; and (b) data in the machine accessible medium which, when accessed by a data processing system with a GPU, enables the data processing system to perform various operations. Those operations comprises (a) executing a program on the GPU; (b) obtaining performance data for the program while the program is executing; (c) while the program is executing, determining a memory/compute ratio for the program, based on the performance data, wherein the memory/compute ratio represents a ratio of memory accesses within the program, relative to compute operations within the program; and (d) dynamically adjusting a frequency of the GPU, while the program is executing, based on the memory/compute ratio.

Example I2 includes the features of Example I1. Also, the operation of obtaining performance data for the program while the program is executing comprises at least one operation from the group consisting of: (a) obtaining the performance data from a software-based profiler; and (b) obtaining the performance data from at least one hardware performance counter.

What is claimed is:

1. A data processing system with support for dynamic adjustment of graphics processing unit frequency for execution of a program, the data processing system comprising:
   a central processing unit (CPU);
   a graphics processing unit (GPU) responsive to the CPU;
   a machine accessible medium responsive to the CPU; and
   data in the machine accessible medium which, when accessed by the CPU, enables the data processing system to perform operations comprising:
      performing, without execution of the program, a control flow analysis to estimate the number of compute operations and the number of memory operations to be performed by the program during execution;
      saving the ratio of the estimate of the number of memory operations to the estimate of the number of compute operations as a predetermined memory/compute ratio for future execution of the program;
      in response to the program being called for execution, automatically retrieving the predetermined memory/compute ratio for the program, wherein the program comprises a workload to execute at least in part on the GPU, and wherein the predetermined memory/compute ratio represents a ratio of memory accesses within the program, relative to compute operations within the program; and
      automatically adjusting a frequency of the GPU, based on the predetermined memory/compute ratio for the program.

2. A data processing system according to claim 1, wherein the operations further comprise:
   after automatically adjusting the frequency of the GPU, launching the program to execute at least partially on the GPU.

3. A data processing system according to claim 1, wherein the data in the machine accessible medium comprises a runtime manager to manage execution of the program, wherein the runtime manager is to:
   determine a type of workload to be performed by the program;
   determine a target GPU frequency based on the type of the workload to be performed; and
   set the frequency of the GPU based on the target GPU frequency.

4. A data processing system according to claim 1, wherein the data in the machine accessible medium further enables the data processing system to perform operations comprising:
   performing a test execution of the program;
   monitoring hardware performance counters during the test execution of the program;
   determining a memory/compute ratio of the test execution of the program; and
   saving the memory/compute ratio of the text execution of the program as the predetermined memory/compute ratio for future execution of the program.

5. A data processing system according to claim 1, wherein the data in the machine accessible medium comprises a runtime manager to manage execution of the program, wherein the runtime manager is to:
   determine an amount of time spent by the program executing compute operations and an amount of time spent by the program executing memory operations; and
   adjust the frequency of the GPU based on the amount of time spent by the program executing compute operations and the amount of time spent by the program executing memory operations.

6. A data processing system according to claim 1, wherein the data in the machine accessible medium further enables the data processing system to perform operations comprising:
   executing each of a plurality of test programs on each of a plurality of hardware platforms and for each of a plurality of GPU frequencies, wherein each of the plurality of test programs have a different memory/compute ratio;
   monitoring performance of each of the plurality of test programs for each of the plurality of hardware platforms and each of the plurality of GPU frequencies; and
   generating, based on the monitored performance, a table comprising an indication of the performance for each of a plurality of memory/compute ratios for each of the plurality of hardware platforms and each of the plurality of GPU frequencies, wherein automatically adjusting the frequency of the GPU based on the predetermined memory/compute ratio for the program comprises accessing the table based on the hardware of the data processing system and the predetermined memory/compute ratio.

7. A data processing system according to claim 1, wherein the data in the machine accessible medium further enables the data processing system to perform operations comprising:

monitoring the memory/compute ratio of the program during execution of the program, wherein the monitored memory/compute ratio is different from the predetermined memory compute ratio; and adjusting the frequency of the GPU to be different from an initial frequency of the GPU based on the predetermined memory/compute ratio for the program.

8. A method for dynamically adjusting the frequency of a graphics processing unit for execution of a program, the method comprising:

performing, without execution of the program, a control flow analysis to estimate the number of compute operations and the number of memory operations to be performed by the program during execution;

saving the ratio of the estimate of the number of memory operations to the estimate of the number of compute operations as a predetermined memory/compute ratio for future execution of the program in response to the program being called for execution in a data processing system with a graphics processing unit (GPU), automatically retrieving the predetermined memory/compute ratio for the program, wherein the program comprises a workload to execute at least in part on the GPU, and wherein the predetermined memory/compute ratio represents a ratio of memory accesses within the program, relative to compute operations within the program; and automatically adjusting a frequency of the GPU, based on the predetermined memory/compute ratio for the program.

9. A method according to claim 8, further comprising:

using a predetermined mapping that maps different memory/compute ratios to respective GPU frequencies to identify a GPU frequency that corresponds with the memory/compute ratio of the program; and wherein the operation of automatically adjusting the frequency of the GPU, based on the predetermined memory/compute ratio for the program comprises adjusting the frequency of the GPU, based on the identified GPU frequency.

10. A method according to claim 8, wherein:

execution of the program is managed by a runtime manager; and the operation of automatically retrieving the memory/compute ratio for the program is performed by the runtime manager.

11. A method according to claim 8, wherein:

execution of the program is managed by a runtime manager; and the operation of automatically adjusting the frequency of the GPU is performed by the runtime manager.

12. A method according to claim 8, further comprising:

determining the memory/compute ratio for the program; and after determining the memory/compute ratio for the program, recording the memory/compute ratio for the program with object code for the program.

13. A method to support dynamic adjustment of graphics processing unit frequency, the method comprising:

determining a memory/compute ratio for a program with a workload suitable for execution on a graphics processing unit (GPU), wherein determining the memory/compute ratio for the program comprises performing, without execution of the program, a control flow analysis to estimate the number of compute operations and the number of memory operations to be performed by the program during execution; and after determining the memory/compute ratio for the program, recording the ratio of the estimate of the number of memory operations to the estimate of the number of compute operations as a memory/compute ratio for the program with object code for the program.

14. A method according to claim 13, further comprising:

compiling source code for the program into object code; and wherein the operation of determining the memory/compute ratio for the program is performed automatically while compiling the program.

15. An apparatus to support dynamic adjustment of graphics processing unit frequency for execution of a program, the apparatus comprising:

a non-transitory machine accessible medium; and data in the machine accessible medium which, when accessed by a data processing system with a graphics processing unit (GPU), enables the data processing system to perform operations comprising:

performing, without execution of the program, a control flow analysis to estimate the number of compute operations and the number of memory operations to be performed by the program during execution;

saving the ratio of the estimate of the number of memory operations to the estimate of the number of compute operations as a predetermined memory/compute ratio for future execution of the program;

in response to the program being called for execution in the data processing system, automatically retrieving the predetermined memory/compute ratio for the program, wherein the program comprises a workload to execute at least in part on the GPU, and wherein the predetermined memory/compute ratio represents a ratio of memory accesses within the program, relative to compute operations within the program; and automatically adjusting a frequency of the GPU, based on the predetermined memory/compute ratio for the program.

16. An apparatus according to claim 15, wherein the operations further comprise:

using a predetermined mapping that maps different memory/compute ratios to respective GPU frequencies to identify a GPU frequency that corresponds with the memory/compute ratio of the program; and wherein the operation of automatically adjusting the frequency of the GPU, based on the predetermined memory/compute ratio for the program comprises adjusting the frequency of the GPU, based on the identified GPU frequency.

17. An apparatus according to claim 15, wherein:

the data in the machine accessible medium comprises a runtime manager to manage execution of the program; and the operation of automatically retrieving the memory/compute ratio for the program is performed by the runtime manager.

18. An apparatus according to claim 15, wherein:

the data in the machine accessible medium comprises a runtime manager to manage execution of the program; and the operation of automatically adjusting the frequency of the GPU is performed by the runtime manager.

19. An apparatus to support dynamic adjustment of graphics processing unit frequency for execution of a program, the apparatus comprising:

a non-transitory machine accessible medium; and data in the machine accessible medium which, when accessed by a data processing system with a graphics processing unit (GPU), enables the data processing system to perform operations comprising:

performing, without execution of the program, a control flow analysis to estimate the number of compute operations and the number of memory operations to be performed by the program during execution;

saving the ratio of the estimate of the number of memory operations to the estimate of the number of compute operations as a predetermined memory/compute ratio for future execution of the program;

executing the program on the GPU at a frequency based on the predetermined memory/compute ratio;

obtaining performance data for the program while the program is executing;

while the program is executing, determining a memory/compute ratio for the program, based on the performance data, wherein the memory/compute ratio determined during execution of the program represents a ratio of memory accesses within the program, relative to compute operations within the program; and dynamically adjusting a frequency of the GPU, while the program is executing, based on the memory/compute ratio determined during execution of the program.

20. An apparatus according to claim 19, wherein the operation of obtaining performance data for the program while the program is executing comprises obtaining the performance data from a software-based profiler.

* * * * *